(12) United States Patent
Newman et al.

(10) Patent No.: US 10,167,086 B2
(45) Date of Patent: Jan. 1, 2019

(54) ANTI-ICING SYSTEM FOR AN AIRCRAFT (71) Applicant: SHORT BROTHERS PLC, Belfast (GB)

(72) Inventors: Richard Newman, Bangor Down (GB); Michael McCausland, Belfast Antrim (GB)

(73) Assignee: SHORT BROTHERS PLC, Belfast (IE)

( * ) Notice: Subject to any disclaimer, the term of this patent is extended or adjusted under 35 U.S.C. 154(b) by 223 days.

(21) Appl. No.: 15/031,526

(22) PCT Filed: Oct. 24, 2014

(86) PCT No.: PCT/GB2014/053174
§ 371 (c)(1),
(2) Date: Apr. 22, 2016

(87) PCT Pub. No.: WO2015/059489
PCT Pub. Date: Apr. 30, 2015

(65) Prior Publication Data
US 2016/0257413 A1 Sep. 8, 2016

Related U.S. Application Data

(60) Provisional application No. 61/895,540, filed on Oct. 25, 2013.

(51) Int. Cl.
*B64D 15/04* (2006.01)
*B64D 33/02* (2006.01)
*F02C 7/047* (2006.01)

(52) U.S. Cl.
CPC ............. *B64D 15/04* (2013.01); *B64D 33/02* (2013.01); *F02C 7/047* (2013.01);
(Continued)

(58) Field of Classification Search
CPC .............................. B64D 15/04; B64D 33/02; B64D 2033/0233; F02C 7/047; F05D 2260/601; F05D 2240/127
See application file for complete search history.

(56) References Cited

U.S. PATENT DOCUMENTS 4,688,745 A 8/1987 Rosenthal
5,088,277 A 2/1992 Schulze
(Continued)

FOREIGN PATENT DOCUMENTS

CN 102753438 A 10/2012
FR 2953254 6/2011
(Continued)

OTHER PUBLICATIONS

Chinese Office Action dated Mar. 16, 2017, for Chinese Patent Application No. 201480058592.0.
(Continued)

*Primary Examiner* — Valentina Xavier
(74) *Attorney, Agent, or Firm* — Karceski IP Law, PLLC (57) ABSTRACT

An anti-icing system is provided within a chamber having an exterior wall of which an outer surface may be subject to ice formation. The anti-icing system comprises a nozzle arranged to inject hot gas within the chamber. A gas-mixing device defines a channel for receiving hot gas from the nozzle. The gas-mixing device includes a swirl-inducing feature for causing gas from the chamber to be drawn into the channel with a swirling effect when hot gas from the nozzle is injected into the channel.

13 Claims, 8 Drawing Sheets

(52) U.S. Cl.
CPC ............... *B64D 2033/0233* (2013.01); *F05D 2240/127* (2013.01); *F05D 2260/601* (2013.01)

(56) References Cited

U.S. PATENT DOCUMENTS

| | | | | |
|---|---|---|---|---|
| 6,354,538 | B1* | 3/2002 | Chilukuri | B64D 15/04 |
| | | | | 244/134 B |
| 9,494,050 | B2* | 11/2016 | Schnoebelen | B64D 15/04 |
| 9,764,847 | B2* | 9/2017 | Wright | B64D 13/08 |
| 2002/0027180 | A1* | 3/2002 | Porte | B64D 15/04 |
| | | | | 244/134 R |
| 2010/0163677 | A1 | 7/2010 | Rocklin et al. | |
| 2011/0168843 | A1 | 7/2011 | Calder | |
| 2012/0248249 | A1 | 10/2012 | Hormiere et al. | |

FOREIGN PATENT DOCUMENTS

| | | |
|---|---|---|
| GB | 2204097 A | 11/1988 |
| WO | 03048543 A1 | 6/2003 |
| WO | 2011073561 A1 | 6/2011 |
| WO | 2011073565 A2 | 6/2011 |

OTHER PUBLICATIONS

European Office Action dated Sep. 20, 2017, for European Patent Application No. 14790690.3.
International Search Report and Written Opinion dated Jan. 23, 2015, for International Patent Application No. PCT/GB2014/053174.

* cited by examiner

ANTI-ICING SYSTEM FOR AN AIRCRAFT

CROSS REFERENCE TO RELATED APPLICATIONS

This is a National Stage Entry into the United States Patent and Trademark Office from International PCT Patent Application No. PCT/GB2014/053174, having an international filing date of Oct. 24, 2014, which claims priority to U.S. Provisional Patent Application No. 61/895,540, filed Oct. 25, 2013, the entire contents of both of which are incorporated by reference herein.

FIELD OF THE INVENTION

An aspect of the invention relates to an anti-icing system. The anti-icing system may be applied in, for example, an aircraft, in particular for preventing ice formation on an inlet lip skin of an engine nacelle. Other aspects of the invention relate to an aircraft and a method of anti-icing an aircraft.

BACKGROUND OF THE INVENTION

Aircraft parts may be subject to ice formation, in particular forward-facing surfaces. For example, ice may form on an inlet lip skin of an engine nacelle during flight. Ice that has formed on an aircraft part may alter aerodynamic properties of the aircraft and increase aircraft weight. This may lead to an increase in fuel consumption or require a different control of the aircraft, or both. Most severely, ice formation may lead to a loss of control over the aircraft. Moreover, a piece of ice that has formed may break off and damage an aircraft part. Such damage may then lead to one of the aforementioned consequences.

An aircraft is advantageously provided with an anti-icing system to prevent ice formation on one or more aircraft parts. In general, an anti-icing system heats an aircraft part that may be subject to ice formation, so as to prevent the latter. For that purpose, an anti-icing system may use hot compressed air that can be bled off from a turbine engine. A gas flow path conveys this hot compressed air toward the aircraft part that needs to be heated in order to prevent ice-formation.

An anti-icing system may comprise a so-called piccolo duct arranged along an inner surface of the aircraft part that requires anti-icing. The compressed hot air that has been bled off is applied to the piccolo duct. The piccolo duct comprises a plurality of relative small outlets that project the compressed hot air to the inner surface, which causes heating of the aircraft part that requires anti-icing. However, a piccolo duct adds weight to the aircraft, which causes an increase in fuel consumption.

Patent publication U.S. Pat. No. 4,688,745 describes an anti-icing system for an annular housing at a leading edge of a jet engine. Hot gases, such as air from a hot, high pressure section of the jet engine are directed through a conduit, which enters the annular housing through a bulkhead. The conduit then turns about 90° to a direction tangential to a leading edge annulus. The hot gases that exit the conduit entrain cooler air in the annular housing, causing a larger mass of air to swirl circularly around the annular housing.

SUMMARY OF THE INVENTION

There is a need for a solution that allows improved anti-icing efficiency.

In accordance with an aspect of the invention there is provided an anti-icing system for use within a chamber having an exterior wall of which an outer surface can be subject to ice formation, the anti-icing system comprising:

a nozzle arranged to inject hot gas within the chamber; and a gas-mixing device defining a channel for receiving hot gas from the nozzle, the gas-mixing device comprising a swirl-inducing feature for causing gas from the chamber to be drawn into the channel with a swirling effect when hot gas from the nozzle is injected into the channel.

In such an anti-icing system, the swirling effect contributes to uniformly mixing the hot gas that the nozzle injects with the gas from the chamber that is drawn into the airflow channel. This, in turn, contributes to a moving mass of air in the chamber that has a more uniform temperature distribution. As a result, the exterior wall that requires anti-icing may be more uniformly heated. A smaller quantity of hot gas may then be sufficient to achieve a desired anti-icing effect. Anti-icing efficiency may therefore be improved. In an aircraft where the hot gas is bled off from an engine, this can improve fuel efficiency.

Furthermore, ice formation may be reduced without a substantial penalty in terms of increased weight. An anti-icing system in accordance with the invention can be relatively lightweight, in particular compared with an anti-icing system that comprises a piccolo duct, which adds weight to an aircraft.

The swirl-inducing feature may comprise a profiled inlet of the gas-mixing device. The profiled inlet may comprise triangular-shaped recesses. The triangular-shaped recesses may be uniformly distributed around the profiled inlet.

The swirl-inducing feature may comprise at least one fin located within the channel. The at least one fin may comprise a curved shape.

The gas-mixing device may comprise a mounting sleeve for mounting the gas-mixing device on the nozzle.

The swirl-inducing feature may comprise multiple fins positioned between the mounting sleeve and an inner surface of the channel. The multiple fins may be positioned in an equidistant manner around the mounting sleeve.

The airflow channel may have a converging section that extends from an inlet toward an outlet of the gas-mixing device.

The converging section of the airflow channel may be followed by a diverging section in a direction toward the outlet.

The inlet may have a diameter that is superior to that of the outlet.

Another aspect of the present invention provides an aircraft comprising the anti-icing system as defined hereinbefore.

The aircraft may comprise:

an arrangement for bleeding off compressed hot air from a turbine engine; and a gas flow path for leading the compressed hot air to the nozzle, whereby the compressed hot air that is led to the nozzle constitutes the hot gas.

The chamber may be an annular chamber in an inlet section of an engine nacelle, the exterior wall being an inlet lip skin of the engine nacelle.

Yet another aspect of the present invention provides a method of anti-icing an aircraft part, the aircraft part comprising a chamber having an exterior wall of which an outer surface can be subject to ice formation, the method comprising:
injecting hot gas from a nozzle into the chamber;
receiving the hot gas from the nozzle within a channel of a gas-mixing device, the gas-mixing device comprising a swirl-inducing feature for causing gas from the chamber to be drawn into the channel with a swirling effect when hot gas from the nozzle is injected into the channel.

BRIEF DESCRIPTION OF THE DRAWINGS

For the purpose of illustration, a detailed description of some embodiments of the invention is presented with reference to accompanying drawings.

DETAILED DESCRIPTION

Figure 1:
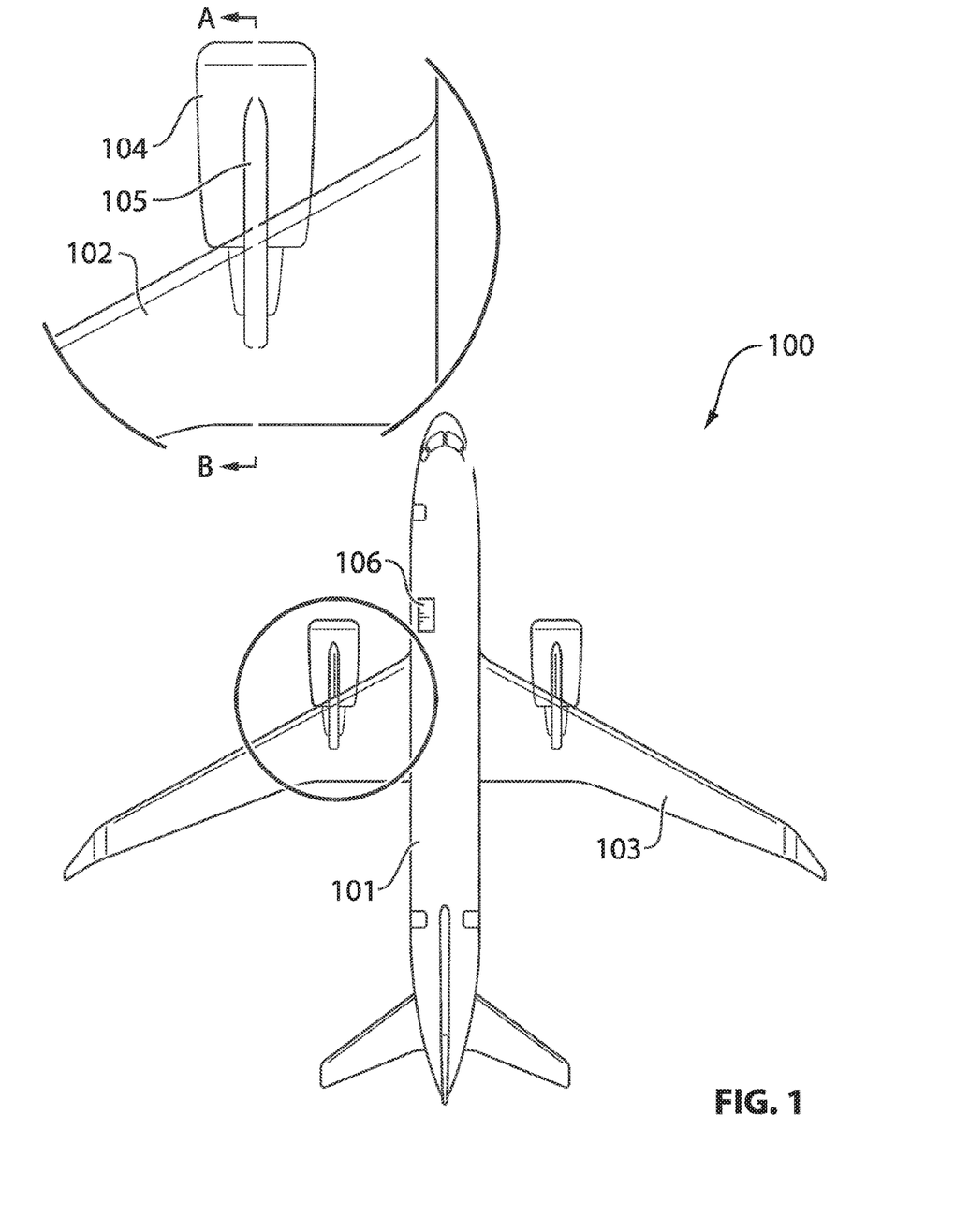
FIG. 1 is a schematic diagram that illustrates an aircraft as seen from a top view.

FIG. 1 schematically illustrates an aircraft as seen from a top view. The aircraft 100 comprises a fuselage 101 and two main wings, one on each side of the fuselage 101, a left wing 102 and a right wing 103. The left wing 102 is provided with a turbine engine 104. The turbine engine 104 is suspended from the left wing 102 by means of a pylon 105. The same applies to the right wing 103.

Figure 2:
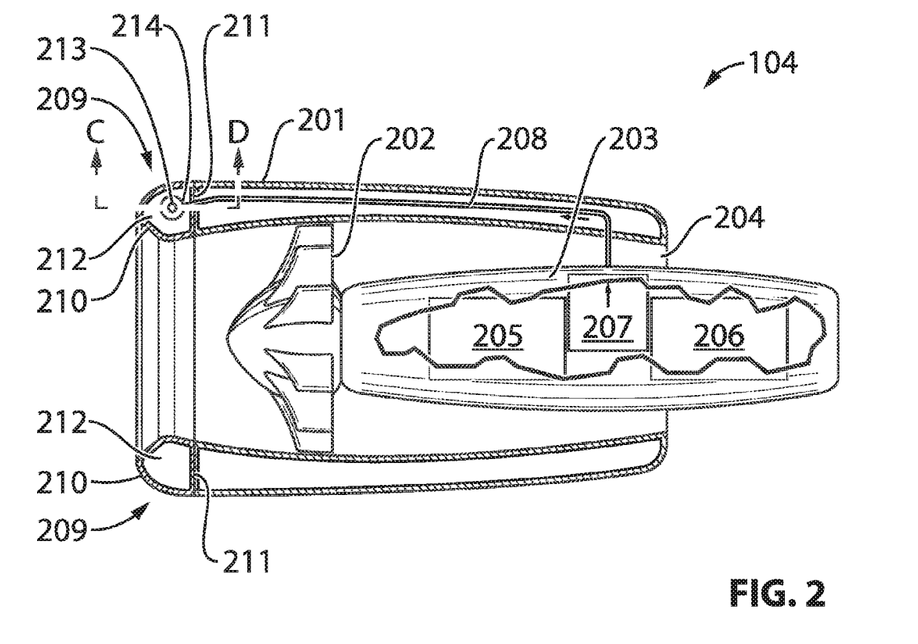
FIG. 2 is a schematic diagram that illustrates a cross-section of an engine of the aircraft.

FIG. 2 schematically illustrates a cross section of the turbine engine 104 taken along a cut line A-B indicated in FIG. 1. The turbine engine 104 comprises a nacelle 201. A fan 202 and an engine core 203 are located in the nacelle 201. A bypass duct 204 surrounds the engine core 203. The engine core 203 comprises a compressor assembly 205 and a combustor 206.

The engine core 203 is provided with a bleed off-take arrangement 207 that has an inlet and outlet. The inlet is located between the compressor assembly 205 and the combustor 206. The outlet of the bleed off-take arrangement 207 is coupled to a gas flow path 208. The gas flow path 208 may comprise several ducts, several controllable valves, and, in some embodiments, a cooling device. This cooling device may be a heat exchanger that is located in the bypass duct 204 in the turbine engine 104.

The nacelle 201 comprises an inlet section 209 that has an inlet lip skin 210 and a bulkhead 211 located behind the inlet lip skin 210. The inlet lip skin 210 constitutes a leading edge of the nacelle 201. The inlet lip skin 210 and the bulkhead 211 define a chamber 212 that has an annular shape. This chamber will be referred to as leading edge chamber 212 hereinafter. The inlet lip skin 210 constitutes an exterior wall of the leading edge chamber 212. The bulkhead 211 constitutes an interior wall of the leading edge chamber 212. The terms "exterior" and "interior" relate to the turbine engine 104 and, more particularly, to the nacelle 201 thereof.

A nozzle 213 is located in the leading edge chamber 212 of the nacelle 201. A gas-mixing device 214 is mounted on the nozzle 213. The nozzle 213 is coupled to the bleed off-take arrangement 207 in the turbine engine 104 by means of the gas flow path 208. To that end, the gas flow path 208 may comprise a particular branch that couples the nozzle 213 to the bleed off-take arrangement 207.

Figure 3:
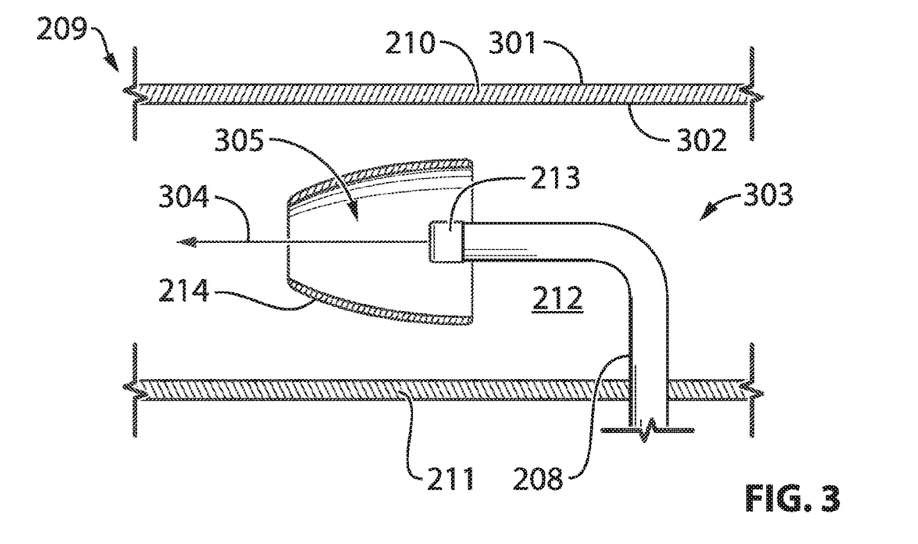
FIG. 3 is a schematic diagram that illustrates a cross-section of an inlet section of a nacelle of the engine, which is provided with an anti-icing system.

FIG. 3 schematically illustrates a cross section of the inlet section 209 of the nacelle 201 taken along a cut line C-D indicated in FIG. 2. The inlet lip skin 210 has an outer surface 301, which can be subject to ice formation, and an inner surface 302, which delimits the leading edge chamber 212. The inlet section 209 of the nacelle 201 is provided with an anti-icing system 303 within the leading edge chamber 212, which is defined by the inlet lip skin 210 and the bulkhead 211.

The anti-icing system 303 comprises the nozzle 213, which is located in the leading edge chamber 212, and the gas-mixing device 214 that is mounted on the nozzle 213. The nozzle 213 has an injection axis 304 that may be substantially parallel to the inlet lip skin 210. The gas-mixing device 214 defines an airflow channel 305 within the leading edge chamber 212 in which the nozzle 213 is located. This airflow channel 305 has a longitudinal center axis that may substantially coincide with the injection axis 304 of the nozzle 213. It should be noted that FIG. 3 illustrates the gas-mixing device 214 in a purely schematic way, disregarding a particular form that the gas-mixing device 214 may have.

In operation, the engine core 203 internally produces compressed hot air, which is available at the inlet of the bleed off-take arrangement 207. A portion of this compressed hot air flows into the gas flow path 208 and reaches the nozzle 213 in the leading edge chamber 212. The nozzle 213 injects the compressed hot air along the inner surface 302 of the inlet lip skin 210. This causes a mass of air to circulate in the leading edge chamber 212, at least partially along the inner surface 302 of the lip skin. This circulating mass of air has a relatively high temperature thanks to the compressed hot air that is injected. The circulating mass of air heats the inlet lip skin 210, which provides an anti-icing effect. This helps to prevent ice formation on the inlet lip skin 210 of the nacelle 201.

More precisely, the nozzle 213 injects the compressed hot air in the airflow channel 305 that the gas-mixing device 214 defines, toward an outlet thereof. The gas-mixing device 214 has a shape that creates a low-pressure at an inlet, which is opposite to the outlet, when the nozzle 213 injects the compressed hot air into the airflow channel 305. This low pressure at the inlet draws air from the leading edge chamber 212 into the airflow channel 305. In the airflow channel 305, this air from the leading edge chamber 212 is caused to enter the channel 305 in a swirling fashion such that it mixes with the compressed hot air that the nozzle 213 injects. This mixing provides a relatively hot air mixture. The gas-mixing device 214 injects this relatively hot air mixture into the leading edge chamber 212 in a direction along the inlet lip skin 210 and the inner surface 302 thereof.

More specifically, the gas-mixing device 214 has a swirl-inducing feature that gives a swirling effect to the air from the leading edge chamber 212 that is drawn into the airflow channel 305. This swirling effect contributes to a uniform mixing of the compressed hot air that the nozzle 213 injects with the air from the leading edge chamber 212 that is drawn into the airflow channel 305. Accordingly, the swirling effect, which occurs within the airflow channel 305, contributes to a uniform temperature distribution in the relatively hot air mixture that the gas-mixing device 214 injects into the leading edge chamber 212. Therefore, the swirling effect contributes to a uniform temperature distribution in the mass of air that circulates in the leading edge chamber 212.

In sum, the gas-mixing device 214 contributes to a heating of the inlet lip skin 210 that is relatively uniform. This, in turn, contributes to efficient anti-icing. A relatively small quantity of the compressed hot air, which is bled off from the turbine engine 104, can be sufficient to achieve a desired anti-icing effect. This contributes to fuel efficiency. Moreover, the anti-icing system 303 can be relatively lightweight, which further contributes to fuel efficiency.

The gas-mixing device 214 may have a diameter comprised between, for example, 1 inch and 4 inches, and a length comprised between, for example, 2 inches and 8 inches. That is, the gas-mixing device 214 may have a diameter comprised between, for example, 25 and 100 millimeters, and a length comprised between, for example, 50 and 200 millimeter. These dimensions can specifically apply to aircraft applications, among other possibilities. It should be appreciated that these dimensions are given for example only, and that other dimensions are possible without departing from the present invention.

The gas-mixing device 214 may be at least partially formed of one or more materials such as, for example, Inconel™ type alloys, stainless steel, or titanium; Inconel being a trademark of Special Metals Corporation.

The swirl-inducing feature of the gas-mixing device 214 may take numerous forms such as, for example, a shape, one or more fins, or a profiled inlet, or any combination of these. Some examples will be provided hereinafter.

Figure 4:
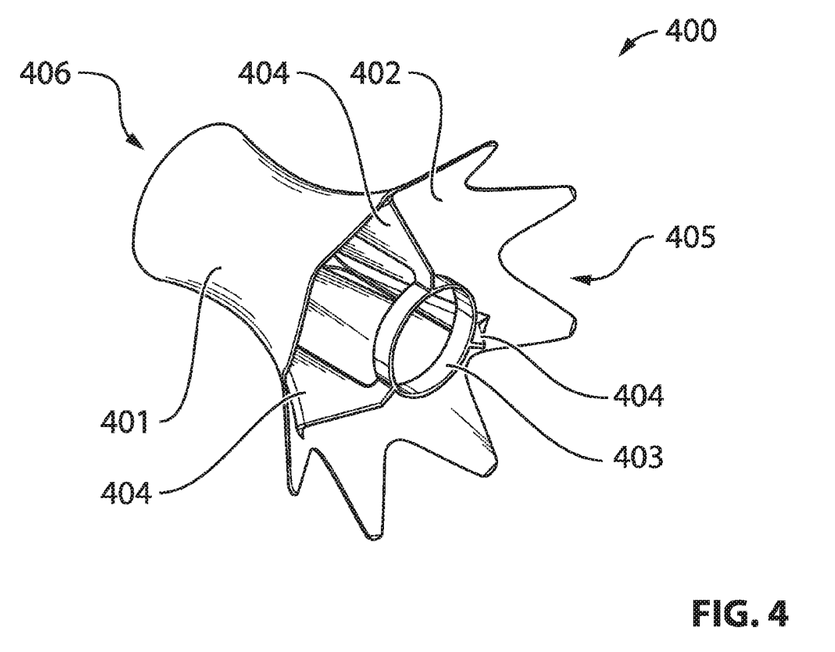
FIGS. 4-6 are schematic diagrams that illustrate a first gas-mixing device in the anti-icing system seen from a perspective view, a side view, and a front view, respectively.
Figure 5:
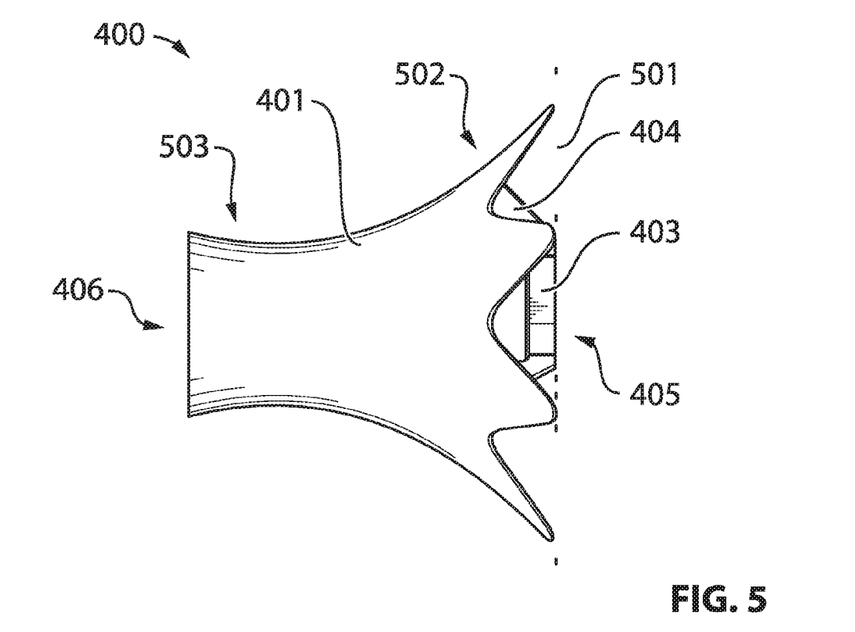
Figure 6:
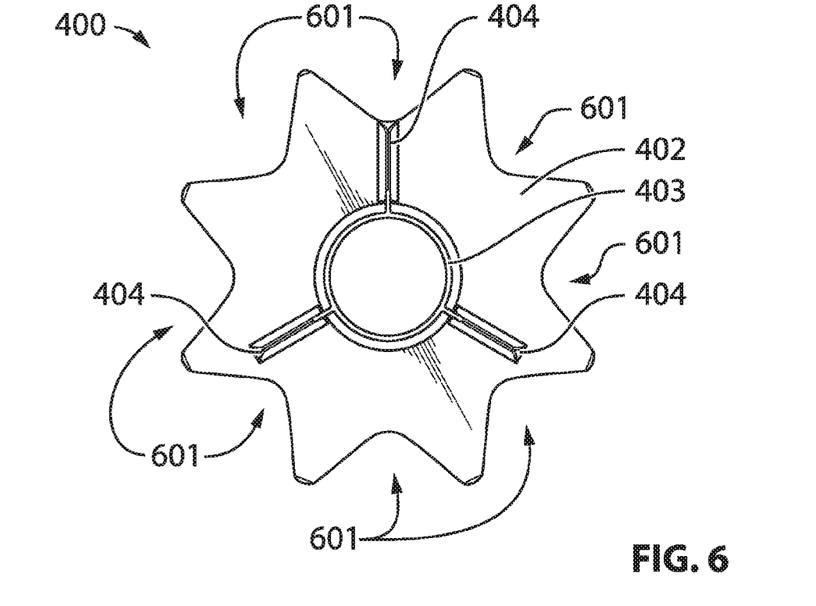

FIGS. 4-6 schematically illustrate a first embodiment of the gas-mixing device 214 which will be referred to as first gas-mixing device 400 hereinafter for reasons of convenience. FIG. 4 schematically illustrates a perspective view of the first gas-mixing device 400. FIG. 5 schematically illustrates a side view of the first gas-mixing device 400. FIG. 6 schematically illustrates a front view of the first gas-mixing device 400.

The first gas-mixing device 400 is in the form of a sleeve-like structure, which comprises a main sleeve 401. An inner surface 402 of the main sleeve 401 defines an airflow channel. The first gas-mixing device 400 further comprises a mounting sleeve 403 for mounting the first gas-mixing device 400 on a nozzle, such as the nozzle 213 illustrated in FIGS. 2 and 3. The main sleeve 401 is fixed to the mounting sleeve 403 by means of various fixation fins 404.

The mounting sleeve 403 is located at an inlet 405 of the first gas-mixing device 400. In more detail, FIG. 5 schematically indicates an inlet plane 501 defined by various extremities of the inlet 405 of the first gas-mixing device 400. The mounting sleeve 403 may be substantially located in this inlet plane 501 as illustrated in FIG. 5, although other locations are possible.

The first gas-mixing device 400 has an outlet 406 that is opposite to the inlet 405. The airflow channel extends between the inlet 405 and the outlet 406. The inlet 405 has a diameter that is superior to that of the outlet 406. The first gas-mixing device 400 can be mounted on a nozzle, via the mounting sleeve 403, such that the nozzle can inject hot gas, which may have a supra-atmospheric pressure, into the airflow channel toward the outlet 406.

The main sleeve 401 is shaped so that the airflow channel has a converging section 502 that extends from the inlet 405 toward the outlet 406. The converging section 502 is followed by a diverging section 503 in a direction toward the outlet 406. The diverging section 503 can extend up to the outlet 406. The airflow channel thus provides a converging action that is followed by a diverging action.

The converging action, which the converging section 502 provides, causes air to be drawn into the airflow channel when the nozzle injects hot gas into the airflow channel, as mentioned hereinbefore. Since the diameter of the inlet 405 is superior to that of the outlet 406, the converging action is stronger than the diverging action.

More specifically, the inlet 405 is profiled: the main sleeve 401 comprises various recesses 601 at the inlet 405. These recesses 601 can be triangular shaped as illustrated in FIGS. 4-6, although other shapes are possible. Moreover, the recesses 601 are uniformly distributed around the inlet 405 of the first gas-mixing device 400. The recesses 601 cause the air that is drawn into the airflow channel to have a swirling effect. This swirling effect contributes to a more uniform mixing within the channel of the gas from the chamber with the hot air injected into the channel by the nozzle. This uniform mixing helps to achieve a relatively high anti-icing efficiency and, therefore, fuel economy, as explained hereinbefore.

Figure 7:
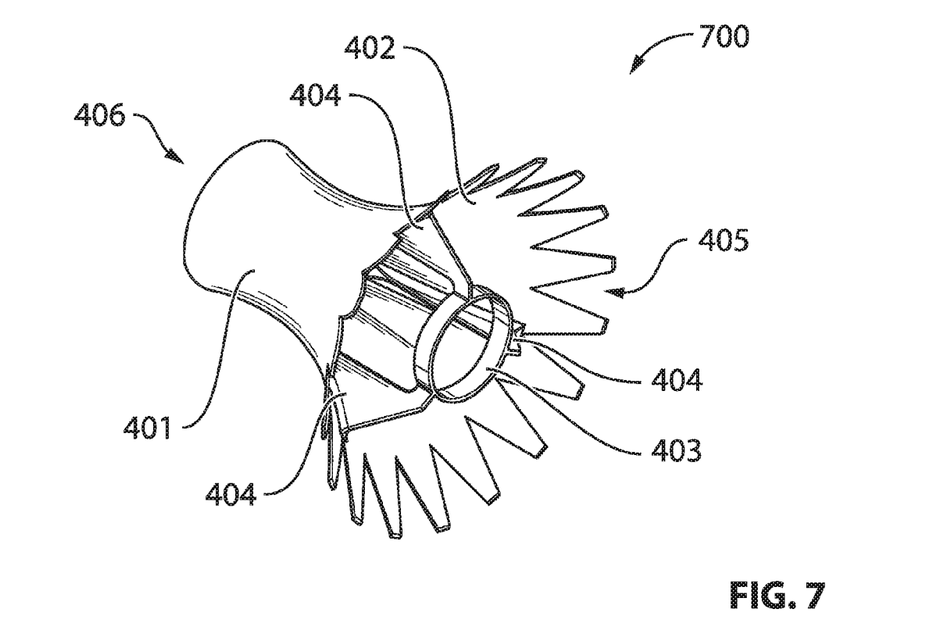
FIGS. 7-9 are schematic diagrams that illustrate an alternative first gas-mixing device seen from a perspective view, a side view, and a front view, respectively.
Figure 8:
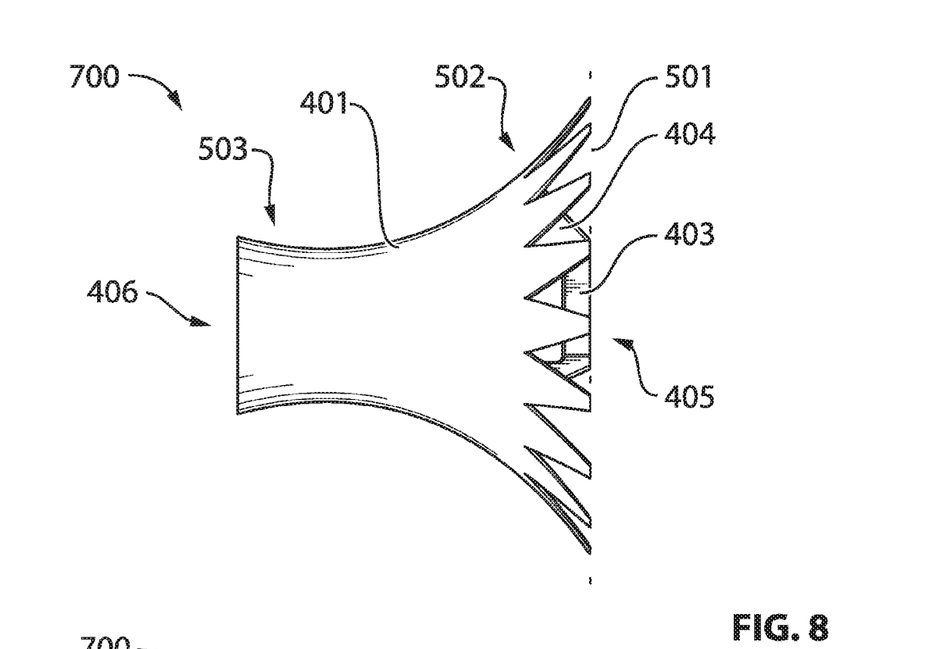
Figure 9:
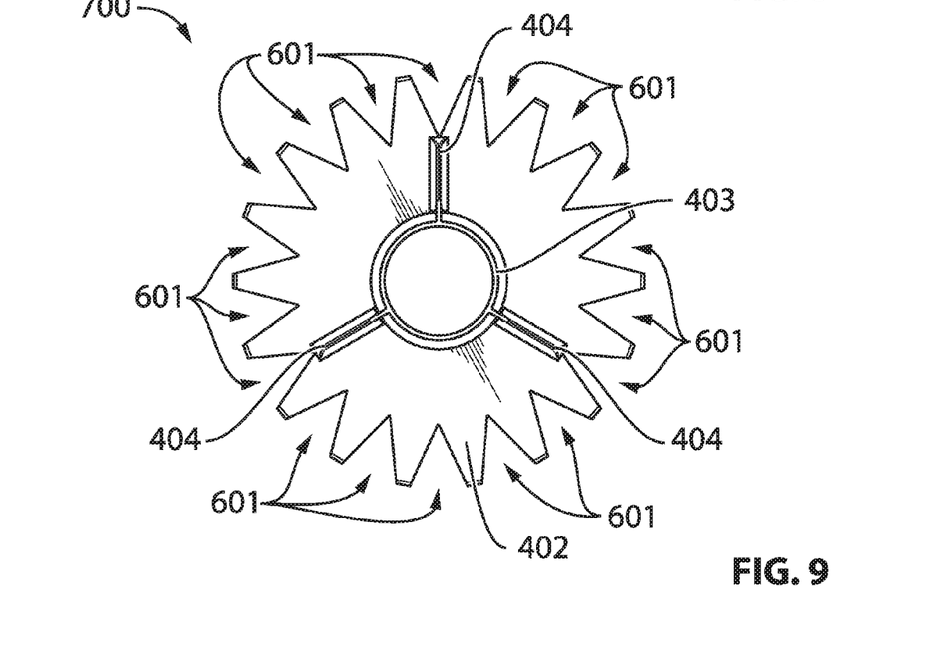

FIGS. 7-9 schematically illustrate an alternative to the first embodiment of the gas-mixing device, which will be referred to as alternative first gas-mixing device 700 hereinafter for reasons of convenience. FIG. 7 schematically illustrates a perspective view of the alternative first gas-mixing device 700. FIG. 8 schematically illustrates a side view of the alternative first gas-mixing device 700. FIG. 9 schematically illustrates a front view of the alternative first gas-mixing device 700.

The alternative first gas-mixing device 700 is similar to the first gas-mixing device 400. Therefore, like elements are denoted by identical reference signs. A difference is that the alternative first gas-mixing device 700 comprises more recesses 601 at the inlet 405. More precisely, the first gas-mixing device 400 comprises 8 recesses 601, whereas the alternative first gas-mixing device 700 comprises 18 recesses 601. Moreover, these 18 recesses 601 are smaller and more densely distributed around the inlet 405. In this example too, the 18 recesses 601 are triangular shaped, although other shapes are possible. The 18 recesses 601 cause a swirling effect too, as described hereinbefore.

Figure 10:
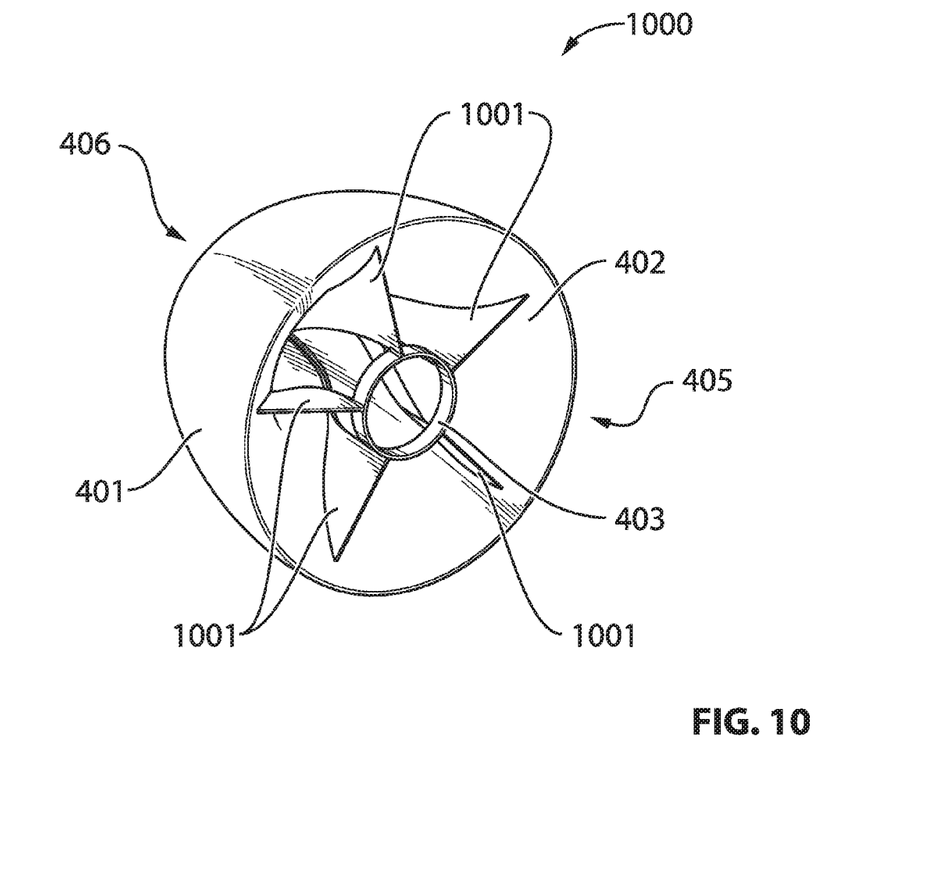
FIGS. 10-12 are schematic diagrams that illustrate a second gas-mixing device seen from a first perspective view, a second perspective view, and a front view, respectively.
Figure 11:
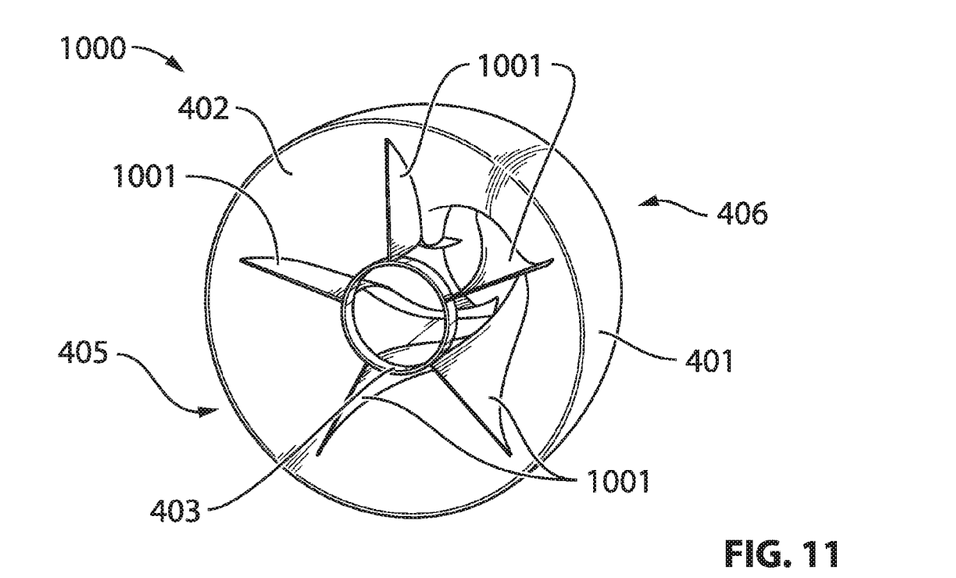
Figure 12:
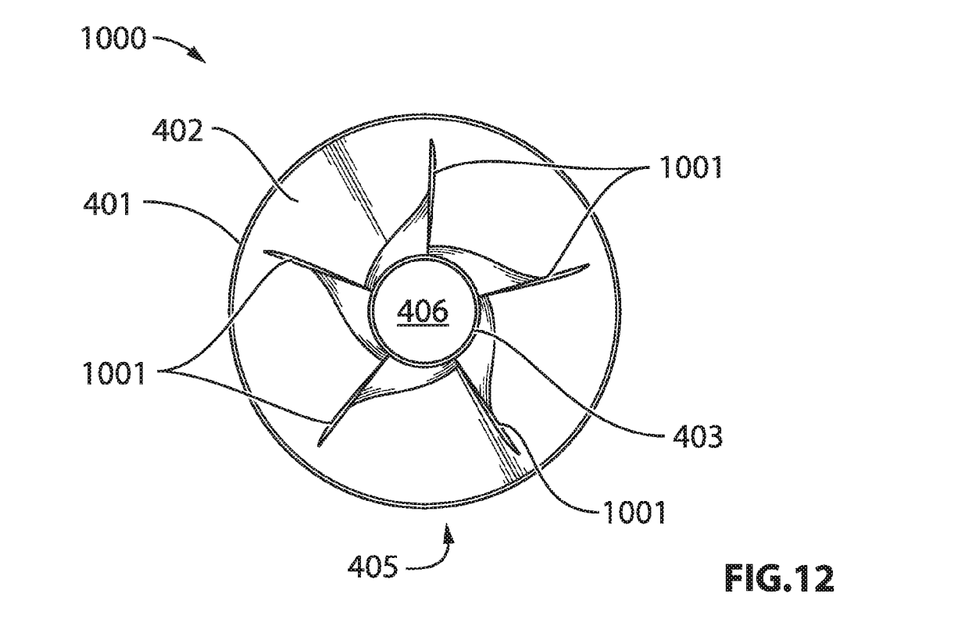

FIGS. 10-12 schematically illustrate a second embodiment of the gas-mixing device 214, which will be referred to as second gas-mixing device 1000 hereinafter for reasons of convenience. FIG. 10 schematically illustrates a first perspective view of the second gas-mixing device 1000. FIG. 11 schematically illustrates a second perspective view of the second gas-mixing device 1000. FIG. 12 schematically illustrates a front view of the second gas-mixing device 1000.

The second gas-mixing device 1000 has some similarities with the first gas-mixing device 400 described hereinbefore. The second gas-mixing device 1000 is also in the form of a sleeve-like structure comprising a main sleeve 401 of which an inner surface 402 defines an airflow channel. The second gas-mixing device 1000 further also comprises a mounting sleeve 403 for mounting the second gas-mixing device 1000 on a nozzle 213, such as the nozzle 213 illustrated in FIGS. 2 and 3.

Further similarities are as follows. The mounting sleeve 403 is also located at an inlet 405 of the second gas-mixing device 1000 and, more precisely, in an inlet plane as described hereinbefore, although other locations are possible. An airflow channel extends between the inlet 405 and an outlet 406 of the second gas-mixing device 1000. The inlet 405 has a diameter that is superior to that of the outlet 406. The second gas-mixing device 1000 can be mounted on a nozzle, via the mounting sleeve 403, such that the nozzle can inject hot gas, which may have a supra-atmospheric pressure, into the airflow channel toward the outlet 406.

A main difference between the second gas-mixing component 1000 illustrated in FIGS. 10-12 and the first gas-mixing component 400 illustrated in FIGS. 4-6 is that for the second gas-mixing component 1000 the main sleeve 401 is fixed to the mounting sleeve 403 by means of various fixation fins 1001 that are curved shaped. These curved-shaped fixation fins 1001 may also be regarded as screw-shaped fins, bent-shaped-fins, which are present in the airflow channel. The curved-shaped fixation fins 1001 cause air that is drawn into the airflow channel to have a swirling effect. This swirling effect contributes to a more uniform mixing within the channel of the gas from the chamber with the hot air injected into the channel by the nozzle. This uniform mixing helps to achieve a relatively high anti-icing efficiency and, therefore, fuel economy, as explained hereinbefore.

Another difference is that the main sleeve 401 of the second gas-mixing device 1000 is shaped so that the airflow channel is entirely converging from the inlet 405 to the outlet 406. Stated otherwise, the airflow channel has no diverging section 503, but only a converging section 502 in which the curved-shaped fixation fins 1001 are arranged. However, in an alternative embodiment, there could also be a diverging section.

Yet other embodiments of the gas-mixing device 214 illustrated in FIG. 3 may comprise a combination of features of the first gas-mixing device 400 and the second gas-mixing device 1000 described hereinbefore. In particular, such an embodiment may comprise a profiled inlet, such as an inlet that has various recesses, as well as curved-shaped fins in an airflow channel that extends between the inlet and an outlet. The profiled inlet and the curved-shaped fins both provide a swirling effect within the gas-mixing device, which can be relatively strong due to a combination of the aforementioned features.

Yet other embodiments may differ from the embodiments described hereinbefore in that a mounting sleeve is located outside an inlet plane defined by one or more extremities at an inlet. That is, referring to FIG. 5, the mounting sleeve 403 may be shifted inwardly with respect to the inlet plane 501. Alternatively, the mounting sleeve 403 may be shifted outwardly with respect to the inlet plane 501. In either case, an inward or an outward location of the mounting sleeve, there may be an offset comprised between, for example, 0 and 10 millimeters (mm) with respect to the inlet plane. A location of the mounting sleeve with respect to the inlet plane that is optimal in terms of anti-icing efficiency may be found empirically.

Referring to FIGS. 2 and 3, the nozzle 213 and the gas-mixing device 214 mounted thereon may be slightly inclined with respect to the inner surface 302 of the inlet lip skin 210. Such an inclination may be in terms of azimuth or elevation, or both. That is, the injection axis 304 need not be perfectly parallel with the inner surface 302 of the inlet lip skin 210 at a location in the leading edge chamber 212 where the nozzle 213 is present. A slight inclination that is optimal in terms of anti-icing efficiency may be found empirically.

The detailed description of some embodiments presented hereinbefore with reference to the drawings, is merely an illustration of the invention and the additional features, which are defined in the claims. The invention can be implemented in numerous different ways. In order to illustrate this, some alternatives are briefly indicated.

The invention may be applied in various types of products or methods related to anti-icing, in particular in aircrafts. Although the description hereinbefore presents embodiments that concern anti-icing of an inlet lip skin of an engine nacelle, the invention may be used to prevent ice formation on other aircraft parts.

There are numerous ways of obtaining hot gas, which can be used in for anti-icing. Although the description hereinbefore presents embodiments in which the hot gas is obtained by bleeding off compressed hot air from a turbine engine, the hot gas may be obtained from other types of sources.

There are numerous ways of implementing a gas-mixing device in accordance with the invention, which draws in air with a swirling effect. For example, a profiled inlet may comprise a swirl-inducing feature other than recesses, such as, for example, a profiled surface. Although the description hereinbefore presents embodiments in which recesses are triangular shaped, other shapes of recesses can provide the swirling effect such as, for example, half-ring shaped recesses. Likewise, there are numerous possible shapes for fins within the gas-mixing device that can provide the swirling effect. Such fins need not necessarily have a fixation function.

The term "aircraft" should be understood in a broad sense. The term may embrace any device that is capable of moving through the air.

In general, there are numerous different ways of implementing the invention, whereby different implementations may have different topologies. In any given topology, a single module may carry out several functions, or several modules may jointly carry out a single function. In this respect, the drawings are very diagrammatic.

The remarks made hereinbefore demonstrate that the detailed description of some embodiments presented with reference to the drawings, is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. An anti-icing system for use within a chamber of an aircraft having an exterior wall of which an outer surface can be subject to ice formation, the anti-icing system comprising:
 a nozzle arranged to inject hot gas within the chamber; and
 a gas-mixing device defining an inlet, an outlet, and an airflow channel extending between the inlet and the outlet for receiving hot gas from the nozzle, the gas-mixing device comprising a swirl-inducing feature for causing gas from the chamber to be drawn into the airflow channel with a swirling effect when hot gas from the nozzle is injected into the airflow channel, wherein the swirl-inducing feature comprises a plurality of various recesses at the inlet of the gas-mixing device, wherein the airflow channel has a converging section that extends from the inlet toward the outlet of the gas-mixing device, wherein the converging section of the airflow channel is followed by a diverging section in a direction toward the outlet, and wherein the inlet has a diameter that is superior to that of the outlet.

2. The anti-icing system according to claim 1, wherein the various recesses define a profiled inlet of the gas-mixing device.

3. The anti-icing system according to claim 2, wherein the profiled inlet comprises triangular-shaped recesses.

4. The anti-icing system according to claim 3, wherein the triangular-shaped recesses are uniformly distributed around the profiled inlet.

5. The anti-icing system according to claim 1, wherein the swirl-inducing feature comprises at least one fin located within the channel.

6. The anti-icing system according to claim 5, wherein the at least one fin comprises a curved shape.

7. The anti-icing system according to claim 1, wherein the gas-mixing device comprises a mounting sleeve for mounting the gas-mixing device on the nozzle.

8. The anti-icing system according to claim 7, wherein the swirl-inducing feature comprises multiple fins positioned between the mounting sleeve and an inner surface of the channel.

9. The anti-icing system according to claim 8, wherein the multiple fins are positioned in an equidistant manner around the mounting sleeve.

10. An aircraft comprising the anti-icing system according to claim 1.

11. The aircraft according to claim 10, comprising:
an arrangement for bleeding off compressed hot air from a turbine engine; and
a gas flow path for leading the compressed hot air to the nozzle, whereby the compressed hot air that is led to the nozzle comprises the hot gas.

12. An aircraft according to claim 11, wherein the chamber is an annular chamber in an inlet section of an engine nacelle, the exterior wall being an inlet lip skin of the engine nacelle.

13. A method of anti-icing an aircraft part, the aircraft part comprising a chamber having an exterior wall of which an outer surface can be subject to ice formation, the method comprising:
injecting hot gas from a nozzle into the chamber;
receiving the hot gas from the nozzle within a channel of a gas-mixing device, the channel extending between an inlet and an outlet of the gas-mixing device, the gas-mixing device comprising a swirl-inducing feature for causing gas from the chamber to be drawn into the channel with a swirling effect when hot gas from the nozzle is injected into the channel, wherein the swirl inducing feature comprises a plurality of various recesses at the inlet of the gas-mixing device, wherein the airflow channel has a converging section that extends from the inlet toward the outlet of the gas-mixing device, wherein the converging section of the airflow channel is followed by a diverging section in a direction toward the outlet, and wherein the inlet has a diameter that is superior to that of the outlet.

* * * * *